United States Patent
Imanishi et al.

(10) Patent No.: US 9,766,485 B2
(45) Date of Patent: Sep. 19, 2017

(54) LIQUID CRYSTAL DISPLAY AND MULTI-SCREEN DISPLAY

(71) Applicant: Mitsubishi Electric Corporation, Tokyo (JP)

(72) Inventors: Yuta Imanishi, Tokyo (JP); Hideki Tanizoe, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/254,711

(22) Filed: Sep. 1, 2016

(65) Prior Publication Data
US 2017/0102570 A1   Apr. 13, 2017

(30) Foreign Application Priority Data
Oct. 9, 2015   (JP) .................. 2015-200728

(51) Int. Cl.
*G02F 1/133*   (2006.01)
*G02F 1/1333*  (2006.01)
*G02F 1/1335*  (2006.01)

(52) U.S. Cl.
CPC ...... *G02F 1/13318* (2013.01); *G02F 1/13336* (2013.01); *G02F 1/133603* (2013.01); *G02F 1/133605* (2013.01); *G02F 2203/09* (2013.01)

(58) Field of Classification Search
CPC ............. G02F 1/13318; G02F 1/13336; G02F 1/133605; G02F 1/133603; G02F 2203/09
See application file for complete search history.

(56) References Cited

U.S. PATENT DOCUMENTS

| | | | |
|---|---|---|---|
| 7,901,102 B2* | 3/2011 | Jung | G02F 1/133603 349/61 |
| 2006/0108519 A1* | 5/2006 | Chou | G02B 6/0068 250/239 |
| 2006/0285311 A1* | 12/2006 | Chang | G02F 1/133603 362/97.3 |
| 2008/0122994 A1* | 5/2008 | Cernasov | G02F 1/133603 349/1 |
| 2009/0140656 A1* | 6/2009 | Kohashikawa | H05B 37/0272 315/151 |
| 2011/0109839 A1* | 5/2011 | Zhu | G02F 1/133603 349/62 |
| 2011/0198484 A1* | 8/2011 | Kurokawa | G06F 3/0412 250/214 R |

(Continued)

FOREIGN PATENT DOCUMENTS

JP   10-222084 A   8/1998

*Primary Examiner* — Donald Raleigh
(74) *Attorney, Agent, or Firm* — Birch, Stewart, Kolasch & Birch, LLP (57) ABSTRACT

A liquid crystal display according to the present invention includes a liquid crystal panel, an LED light source to irradiate a back surface side of the liquid crystal panel with light, a diffusion plate disposed between the liquid crystal panel and the LED light source, a reflection sheet disposed on a side opposite to the diffusion plate with respect to the LED light source, a panel holder disposed on a back surface side of the reflection sheet, and at least one photodetector disposed on the back surface side of the reflection sheet and to detect light reflected by a back surface of the diffusion plate and propagated in a gap between the reflection sheet and the panel holder.

10 Claims, 10 Drawing Sheets

(56) References Cited

U.S. PATENT DOCUMENTS

| | | | |
|---|---|---|---|
| 2012/0008063 A1* | 1/2012 | Asamizu | G02F 1/133611 349/61 |
| 2012/0147592 A1* | 6/2012 | Takase | G02F 1/133608 362/97.1 |
| 2013/0002963 A1* | 1/2013 | Yokota | G02F 1/133603 348/728 |

* cited by examiner

LIQUID CRYSTAL DISPLAY AND MULTI-SCREEN DISPLAY

BACKGROUND OF THE INVENTION

Field of the Invention

The present invention relates to a liquid crystal display and a multi-screen display.

Description of the Background Art

Generally, in a case of a multi-screen display which configures a large screen display by using a plurality of liquid crystal displays, the multi-screen display is configured by combining a plurality of liquid crystal displays using an LCD (Liquid Crystal Display) with a size of about 40 to 60 inches. Conventionally, a CCFL (Cold Cathode Fluorescent Lamp) has been used as a light source of the liquid crystal display using the LCD. However, in recent years, a light source which configures a backlight to illuminate an LCD panel from a back surface by disposing a plurality of LEDs (Light Emitting Diodes) directly below the liquid crystal panel has been the mainstream. In a video image display part of the liquid crystal display, a diffusion sheet and a diffusion plate are disposed on the back surface of the liquid crystal panel, and light of the backlight transmitted through the diffusion sheet and the diffusion plate configures an image of a liquid crystal module. The LED light source used for the backlight is basically disposed inside a backlight housing of the liquid crystal panel, and a reflection sheet is disposed on a back surface side of the LED light source. All of these configuration members are covered with a sheet metal. Further, a panel driving substrate or the like is disposed on a back surface of the sheet metal, and the substrate and an internal LCD module are unitized as a liquid crystal panel module in a state in which they are connected by a lead wire.

When a large screen is configured, luminances of the plurality of liquid crystal displays which configures the large screen must be uniform. Accordingly, it is necessary to detect the luminance of each individual liquid crystal display. As the detection method, there is a method of detecting light transmitted through a reflection sheet disposed on a back surface of an LED light source (see Japanese Patent Application Laid-Open No. 10-222084 (1998)).

In Japanese Patent Application Laid-Open No. 10-222084 (1998), a photodetector detects the light transmitted through the reflection sheet disposed on the back surface of the LED light source. However, in the liquid crystal display in recent years, since a reflectance of the reflection sheet has been improved, the light transmitted through the reflection sheet does not have a detectable intensity.

SUMMARY OF THE INVENTION

An object of the present invention is to provide a liquid crystal display and a multi-screen display which detects a luminance of a light source more accurately.

A liquid crystal display according to one aspect of the present invention includes a liquid crystal panel and an LED light source to irradiate a back surface side of the liquid crystal panel with light. The liquid crystal display further includes a diffusion plate disposed between the liquid crystal panel and the LED light source, a reflection sheet disposed on a side opposite to the diffusion plate with respect to the LED light source, and a panel holder disposed on a back surface side of the reflection sheet. The liquid crystal display further includes at least one photodetector disposed on the back surface side of the reflection sheet and to detect light reflected by a back surface of the diffusion plate and propagated in a gap between the reflection sheet and the panel holder.

According to the liquid crystal display of the present invention, the light can be detected accurately and stably by detecting the light propagated in the gap between the reflection sheet and the panel holder.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

<Configuration>

Figure 1:
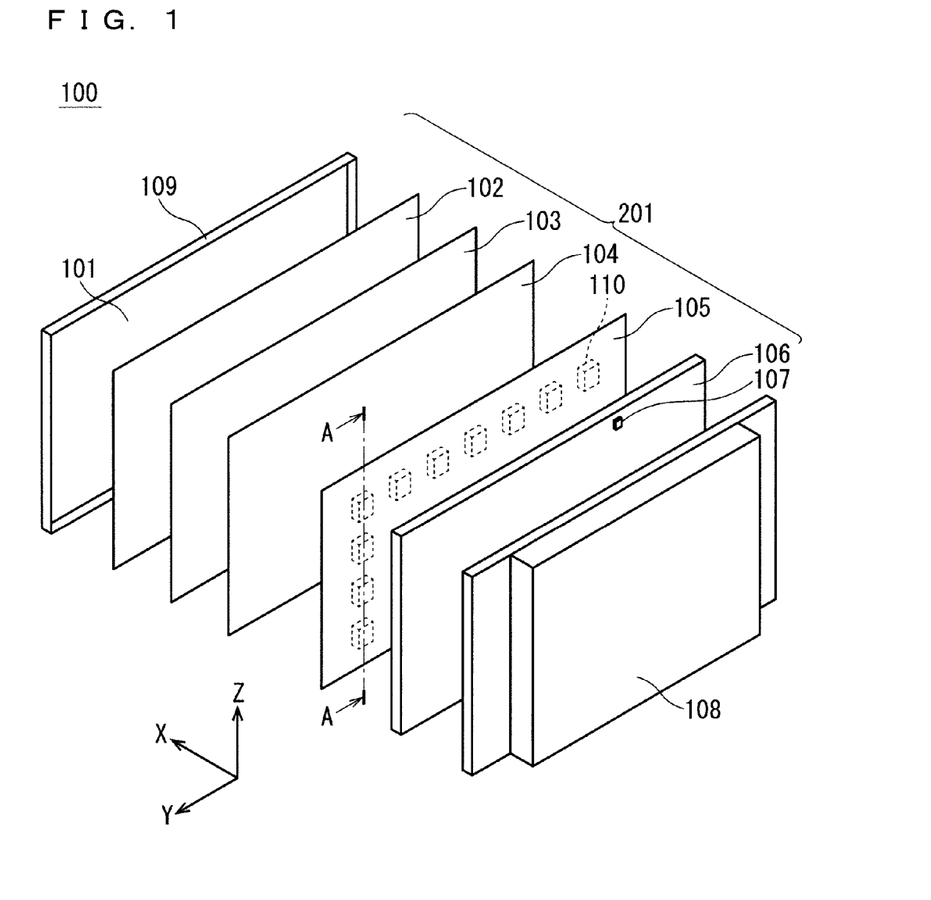
FIG. 1 is an exploded perspective view of a liquid crystal display according to first preferred embodiment.
Figure 2:
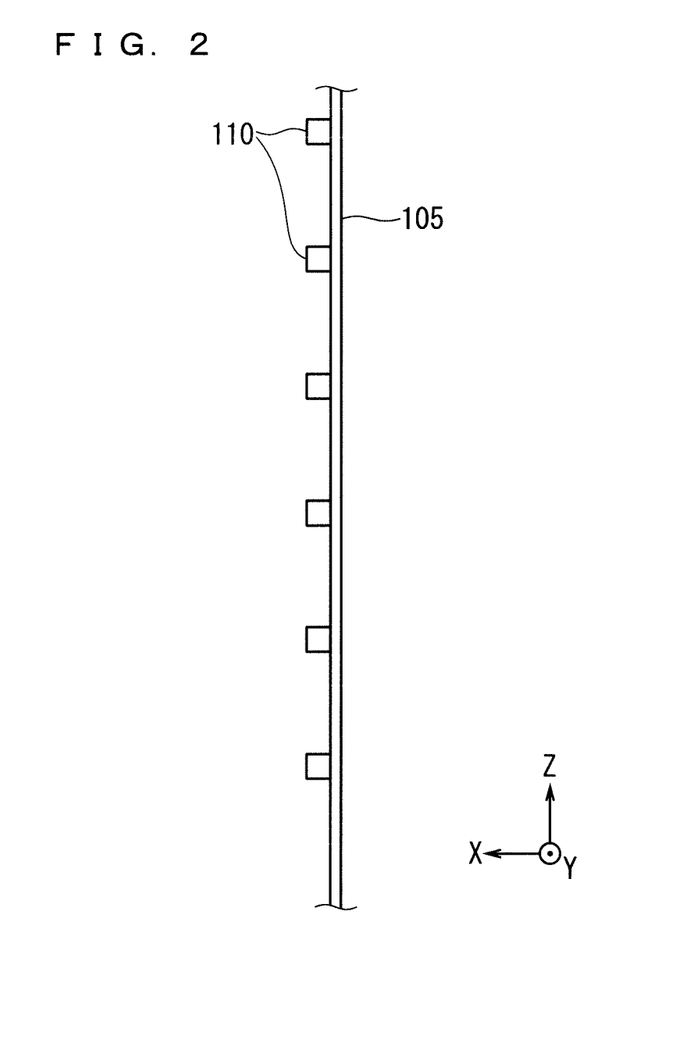
FIG. 2 is a sectional view of LED light sources and a reflection sheet of the liquid crystal display according to the first preferred embodiment.

FIG. 1 is an exploded perspective view of a liquid crystal display 100 in first preferred embodiment. Further, FIG. 2 is a sectional view of LED light sources 110 and a reflection sheet 105 taken along a line A-A in FIG. 1. As shown in FIGS. 1 and 2, a front surface side direction of each panel member (e.g., a liquid crystal panel 101) is defined as an X direction and a back surface side direction thereof is defined as a −X direction in the present specification.

The liquid crystal display 100 includes a liquid crystal module 201 and a back panel 108 which covers a back surface of the liquid crystal module 201. The liquid crystal module 201 includes the liquid crystal panel 101, the LED light sources 110, a diffusion plate 104, the reflection sheet 105, a panel holder 106, and a photodetector 107.

A plurality of the LED light sources 110 is arranged on the reflection sheet 105. The LED light sources 110 irradiate a back surface side of the liquid crystal panel 101 with light. The diffusion plate 104 is disposed between the liquid crystal panel 101 and the LED light sources 110. The reflection sheet 105 is disposed on a side opposite to the diffusion plate 104 with respect to the LED light sources 110. The panel holder 106 is disposed on a back surface side of the reflection sheet 105.

The photodetector 107 is disposed on the back surface side of the reflection sheet 105. As described below, the photodetector 107 detects light reflected by a back surface of the diffusion plate 104 and propagated in a gap between the diffusion plate 104 and the panel holder 106. The photodetector 107 is, for example, a photosensor using a photocell or a photosensor using a photodiode.

Further, a light condensing sheet 102 and a diffusion sheet 103 are disposed between the liquid crystal panel 101 and the diffusion plate 104. The liquid crystal panel 101, the light condensing sheet 102, the diffusion sheet 103, and the diffusion plate 104 are held in a bezel 109 and brought into close contact with one another. A back surface of the panel holder 106 is covered with the back panel 108.

The light emitted from the plurality of LED light sources 110 arranged on the reflection sheet 105 passes through the diffusion plate 104, the diffusion sheet 103, and the light condensing sheet 102 to be projected on the entire back surface of the liquid crystal panel 101. The reflection sheet 105 reflects the light emitted from the LED light sources 110 in the back surface direction onto a front surface side (i.e., the diffusion plate 104 side). The light emitted from the LED light sources 110 is not transmitted through the reflection sheet 105.

Figure 3:
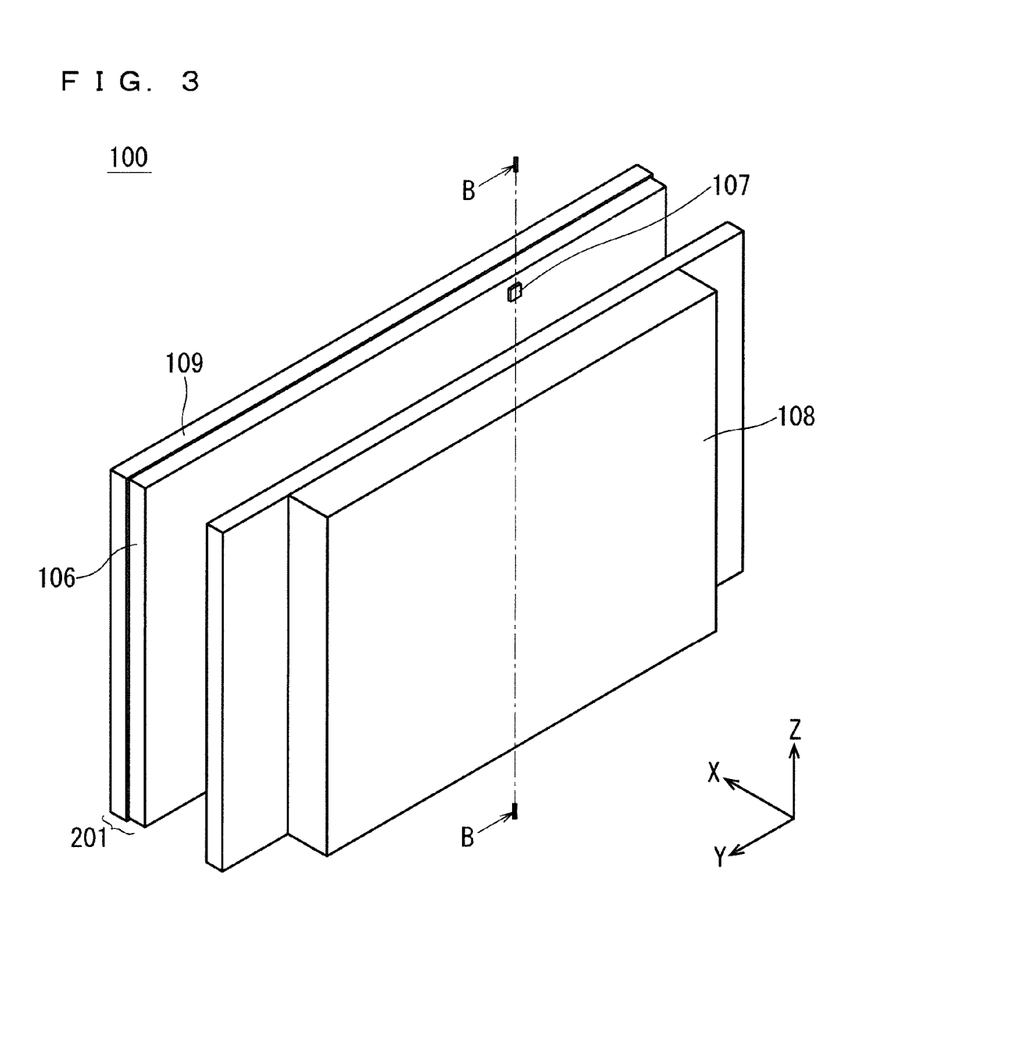
FIG. 3 is a perspective view of the liquid crystal display according to the first preferred embodiment in a state in which a back panel is removed.
Figure 4:
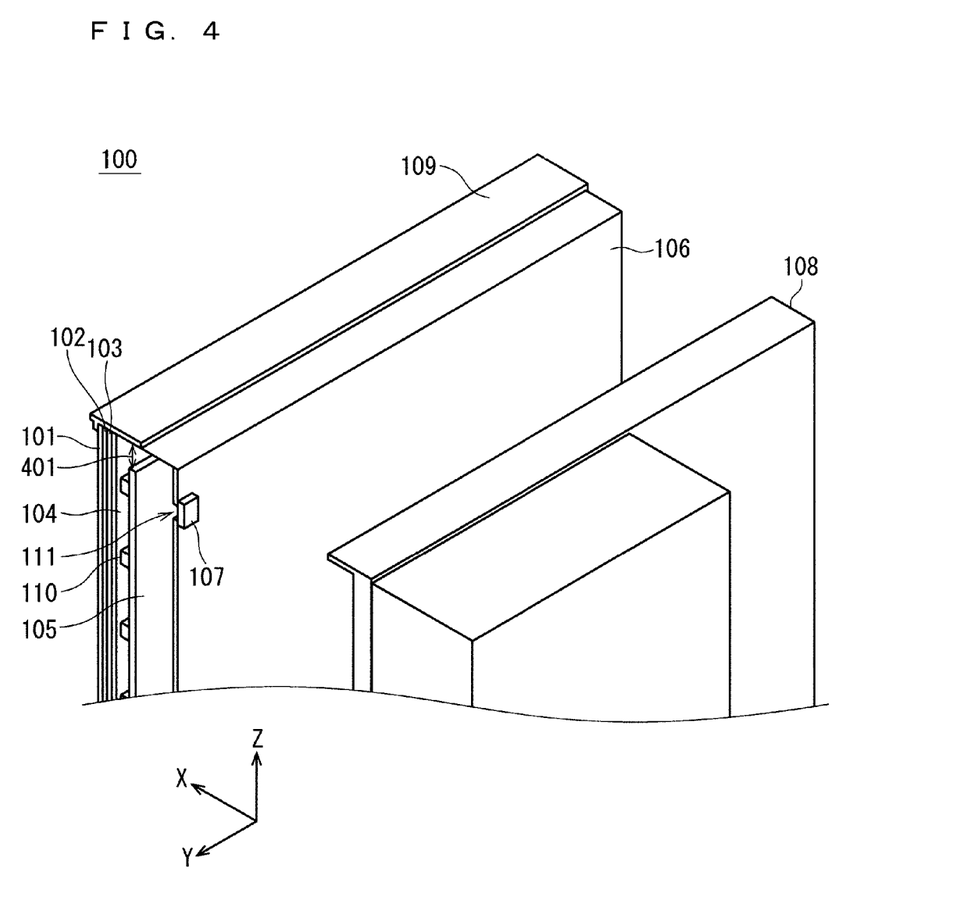
FIG. 4 is a perspective sectional view of the liquid crystal display according to the first preferred embodiment.
Figure 5:
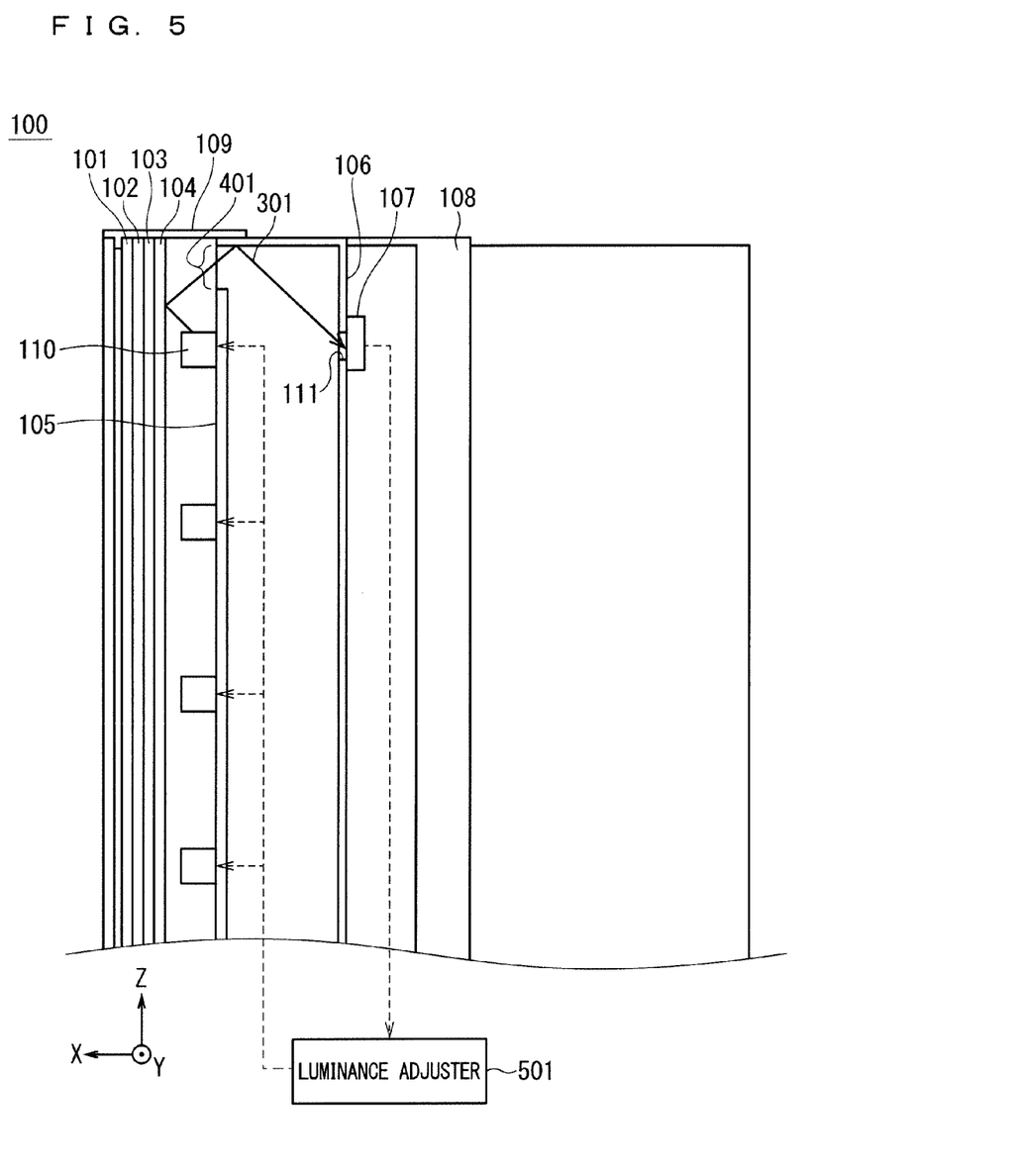
FIG. 5 is a sectional view of the liquid crystal display according to the first preferred embodiment.

FIG. 3 is a perspective view of the liquid crystal display 100 in a state in which the back panel 108 is removed. FIG. 4 is a perspective sectional view of the liquid crystal display 100 taken along a line B-B in FIG. 3. FIG. 5 is a sectional view of the liquid crystal display 100 taken along the line B-B in FIG. 3. As shown in FIGS. 4 and 5, a hole 111 which penetrates the back surface of the panel holder 106 is provided in the panel holder 106. Also, the photodetector 107 is disposed on the back surface side of the panel holder 106 so as to overlap with the hole 111. Further, as shown in FIGS. 4 and 5, the reflection sheet 105 is smaller than the diffusion plate 104 in the first preferred embodiment. Accordingly, a gap 401 is provided between the reflection sheet 105 and the panel holder 106.

FIG. 5 shows an optical path 301 of light incident on the photodetector 107. A part of the light emitted from the LED light sources 110 is reflected by the back surface of the diffusion plate 104 and passes through the gap 401 between the reflection sheet 105 and the panel holder 106. A part of the light passed through the gap 401 passes through the hole 111 of the panel holder 106. The light passed through the hole of the panel holder 106 enters the photodetector 107. In other words, the photodetector 107 detects a luminance of the light passed through the hole 111 of the panel holder 106. Further, a part of the light reflected by the diffusion plate 104 after reflecting on the reflection sheet 105 also enters the photodetector 107 by passing through the gap 401 and the hole 111.

In the first preferred embodiment, as compared with Japanese Patent Application Laid-Open No. 10-222084 (1998) in which the light transmitted through the reflection sheet 105 is detected, since the light passed through the gap 401 between the reflection sheet 105 and the diffusion plate 104 is detected, a quantity of light to be detected is stable and not attenuated.

As shown in FIG. 5, the liquid crystal display 100 includes a luminance adjuster 501. The luminance adjuster 501 adjusts a luminance of the LED light source 110 based on a detection result of the photodetector 107.

Figure 6:
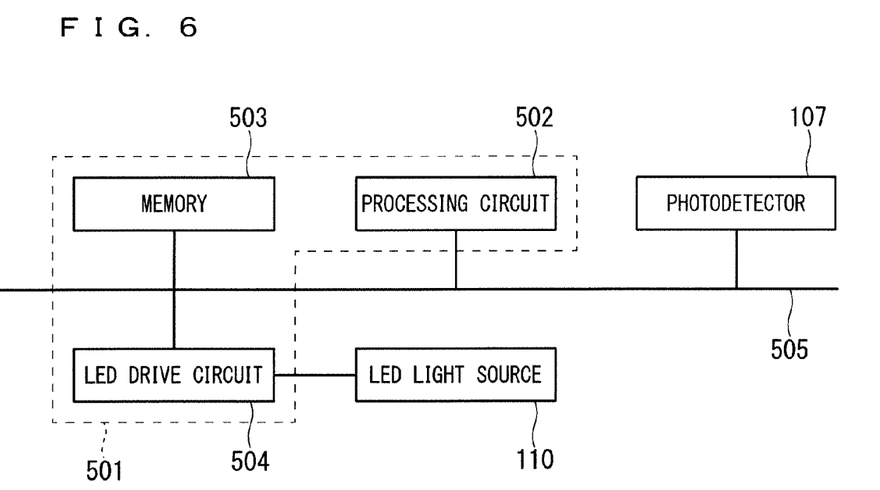
FIG. 6 is a hardware configuration diagram concerning luminance adjustment of the liquid crystal display according to the first preferred embodiment.

FIG. 6 is a hardware configuration diagram concerning the luminance adjustment of the liquid crystal display 100. As shown in FIG. 6, the liquid crystal display 100 includes a processing circuit 502, a memory 503, and an LED drive circuit 504. The photodetector 107, the processing circuit 502, the memory 503, and the LED drive circuit 504 are mutually connected by a bus 505. The luminance adjuster 501 is realized by the processing circuit 502, the memory 503, and the LED drive circuit 504. The LED drive circuit 504 changes the luminance of each of the LED light sources 110 based on a signal from the processing circuit 502.

The processing circuit 502 and the LED drive circuit 504 may be dedicated hardware. Further, the processing circuit 502 or the LED drive circuit 504 may be a CPU (Central Processing Unit, also referred to as a central processor, a processing unit, an arithmetic unit, a microprocessor, a microcomputer, a processor, or a DSP) to execute a program stored in the memory 503.

In a case where the processing circuit 502 and the LED drive circuit 504 are dedicated hardware, the processing circuit 502 or the LED drive circuit 504 corresponds to, for example, a single circuit, a composite circuit, a programmed processor, a parallel programmed processor, an ASIC, an FPGA, or a combination of these.

In a case where the processing circuit 502 and the LED drive circuit 504 are CPUs, a function of the luminance adjuster 501 is realized by software, firmware, or a combination of the software and the firmware. The software or the firmware is described as a program and stored in the memory 503. The processing circuit 502 and the LED drive circuit 504 realize the function of the luminance adjuster 501 by reading and executing the programs stored in the memory 503. Further, these programs can be also referred to as those which allow a computer to execute a procedure or a method of the luminance adjuster 501. Here, the memory 503 is a volatile or nonvolatile semiconductor memory, such as a RAM, a ROM, a flash memory, an EPROM, or an EEPROM.

<Operation>

Figure 7:
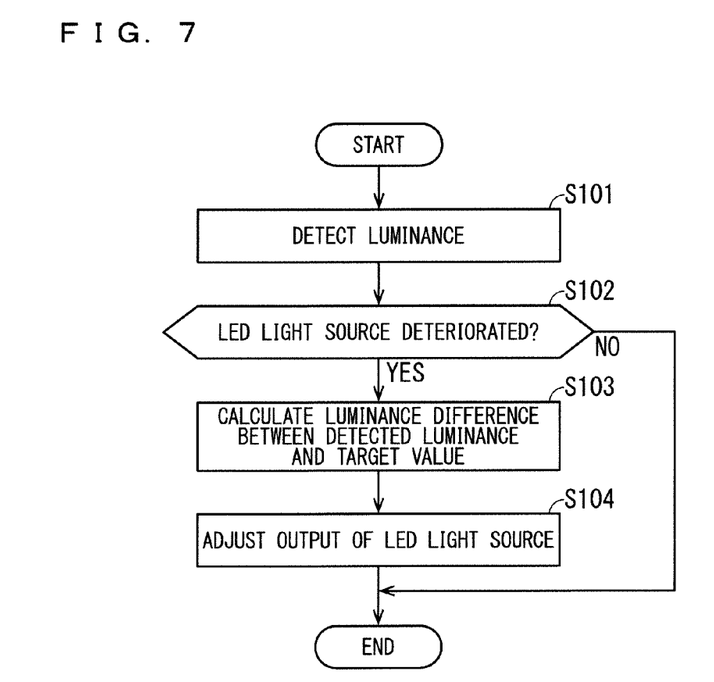
FIG. 7 is a flowchart of luminance adjusting operation of the liquid crystal display according to the first preferred embodiment.

FIG. 7 is a flowchart of luminance adjusting operation of the liquid crystal display 100. The LED light source 110 has a characteristic of deteriorating over time, and a luminance thereof is reduced according to elapsed time. First, the photodetector 107 detects a luminance of incident light (step S101). Next, the luminance adjuster 501 determines whether the LED light source 110 is deteriorated (step S102). For example, the memory 503 stores beforehand a reference value for determining the deterioration and the luminance adjuster 501 compares the luminance detected by the photodetector 107 and the reference value. Then, if the luminance is lower than the reference value, the luminance adjuster 501 determines that the LED light source 110 is deteriorated and executes steps S103 and S104.

In step S103, the luminance adjuster 501 calculates a luminance difference between the luminance detected by the photodetector 107 and a target value. For example, the target value is set to a luminance larger than the luminance detected by the photodetector 107. Then, in step 104, the luminance adjuster 501 adjusts an output of each of the LED light sources 110 based on the luminance difference calculated in step S103. The output adjustment is performed by changing a value of current applied to each of the LED light sources 110. For example, if the current applied to the LED light source 110 increases, the luminance of the LED light source 110 also increases.

<Effects>

The liquid crystal display 100 in the first preferred embodiment includes the liquid crystal panel 101, the LED light source 110 to irradiate the back surface side of the liquid crystal panel 101 with light, the diffusion plate 104 disposed between the liquid crystal panel 101 and the LED light source 110, the reflection sheet 105 disposed on a side opposite to the diffusion plate 104 with respect to the LED light source 110, the panel holder 106 disposed on the back surface side of the reflection sheet 105, and at least the one photodetector 107 disposed on the back surface side of the reflection sheet 105 and to detect the light reflected by the back surface of the diffusion plate 104 and propagated in the gap 401 between the reflection sheet 105 and the panel holder 106.

In the first preferred embodiment, the photodetector 107 detects the light passed through the gap 401 between the reflection sheet 105 and the panel holder 106. Accordingly, as compared with Japanese Patent Application Laid-Open No. 10-222084 (1998) in which the light transmitted through the reflection sheet 105 is detected, a quantity of light to be detected is stable and not attenuated. In other words, the quantity of light to be detected is accurate and stable by detecting not leakage light transmitted through the reflection sheet 105, but the light passed through the gap 401 between the reflection sheet 105 and the diffusion plate 104. Accordingly, it is possible to appropriately control the output of the luminance of the LED light source 110, and a change in the output luminance caused by the deterioration over time or the like of the liquid crystal display 100 can be accurately corrected.

Further, in the liquid crystal display 100 of the first preferred embodiment, the photodetector 107 is disposed on the side opposite to the reflection sheet 105 with respect to the panel holder 106, the panel holder 106 is provided with the hole 111, and the optical path 301 of the propagating light passes through the hole 111.

Therefore, even in a case where the photodetector 107 is disposed on the rear surface side of the panel holder 106, it is possible to detect the light propagated in the gap 401 through the hole 111 by providing the hole 111 in the panel holder 106.

Further, the liquid crystal display 100 in the first preferred embodiment further includes the luminance adjuster 501 to adjust the luminance of the LED light source 110 based on the detection result of at least the one photodetector 107. Therefore, the luminance of the LED light source 110 can be adjusted by the luminance adjuster 501 based on the detection result of the photodetector 107.

Second Preferred Embodiment

<Configuration>

Figure 8:
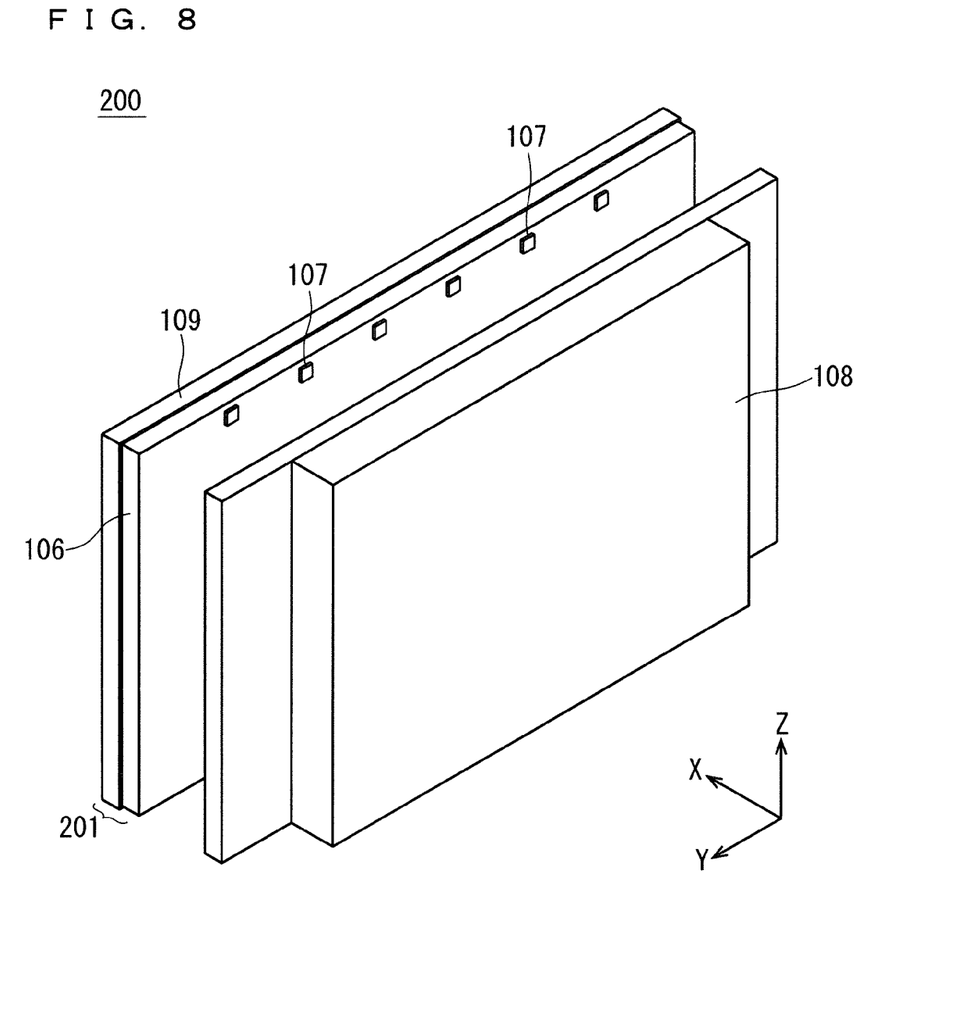
FIG. 8 is a perspective view of a liquid crystal display according to second preferred embodiment in a state in which a back panel is removed.

FIG. 8 is a perspective view of a liquid crystal display 200 according to second preferred embodiment in a state in which a back panel 108 is removed. As shown in FIG. 8, a plurality of photodetectors 107 is disposed in the second preferred embodiment. A panel holder 106 is provided with a plurality of holes 111 corresponding to the respective photodetectors 107. Configurations of the hole 111 and the photodetector 107 are similar to those in FIG. 5. In other words, as shown in FIG. 5, each of the photodetectors 107 detects light propagated in a gap 401 between a reflection sheet 105 and the panel holder 106 and the hole 111. Since the other configurations are the same as those in the first preferred embodiment, descriptions thereof are omitted.

<Operation>

Only steps different from those in the first preferred embodiment (FIG. 7) will be described in the second preferred embodiment. First, each of the plurality of photodetectors 107 detects a luminance of incident light (step S101). Next, a luminance adjuster 501 determines whether an LED light source 110 is deteriorated (step S102). For example, a memory 503 stores beforehand a reference value for determining the deterioration, and the luminance adjuster 501 compares an addition average value of the luminances detected by the plurality of photodetectors 107 and a reference value. Since the following steps S103, S104 are the same as those in the first preferred embodiment, descriptions thereof are omitted.

By averaging the luminances detected by the plurality of photodetectors 107, detection accuracy can be enhanced more than a case of the one photodetector 107.

Further, for example, in a case where a positional relation between the hole 111 and the photodetector 107 is deviated due to vibrations during transportation of the liquid crystal display 200 or the like, the photodetector 107 cannot accurately perform detection of light. In the second preferred embodiment, since the plurality of photodetectors 107 is disposed, the detection of light can be performed stably.

<Effects>

In the liquid crystal display 200 of the second preferred embodiment, the at least one photodetector includes a plurality of photodetectors 107. Therefore, since it is possible to adjust the luminance by utilizing detection results of the plurality of photodetectors 107, the luminance can be adjusted with higher accuracy.

Third Preferred Embodiment

Figure 9:
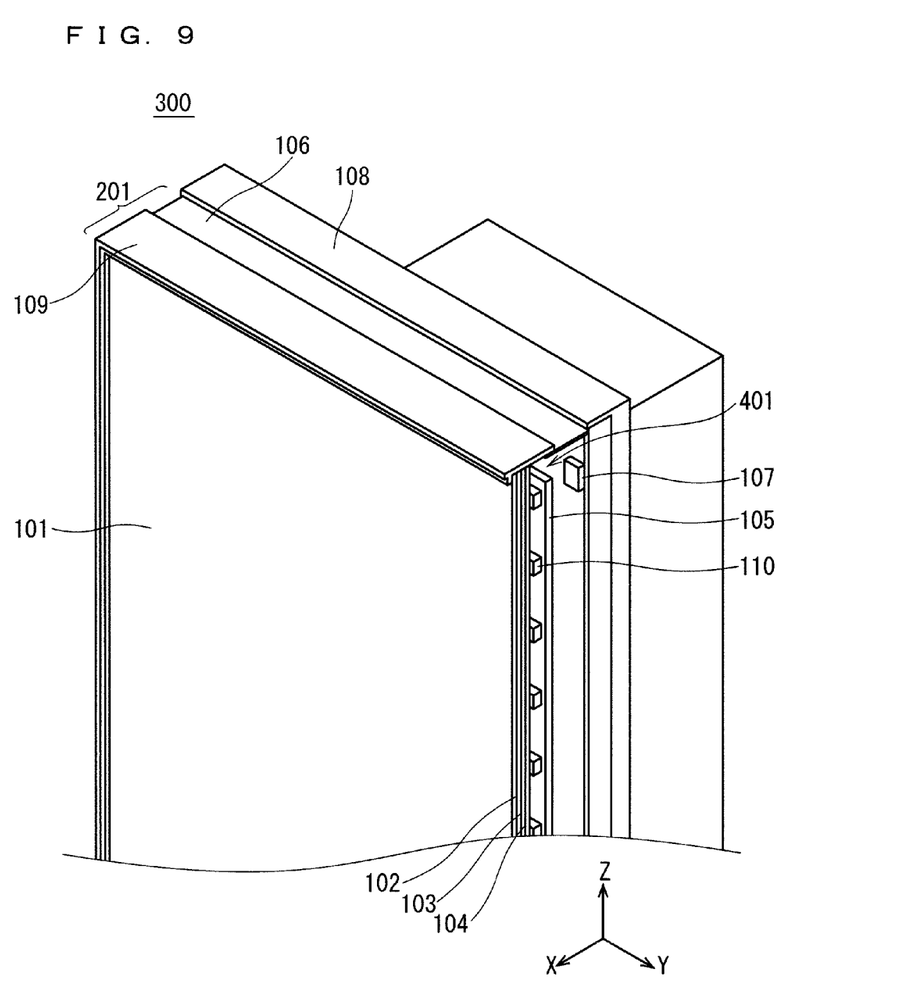
FIG. 9 is a perspective sectional view of a liquid crystal display according to third preferred embodiment.
Figure 10:
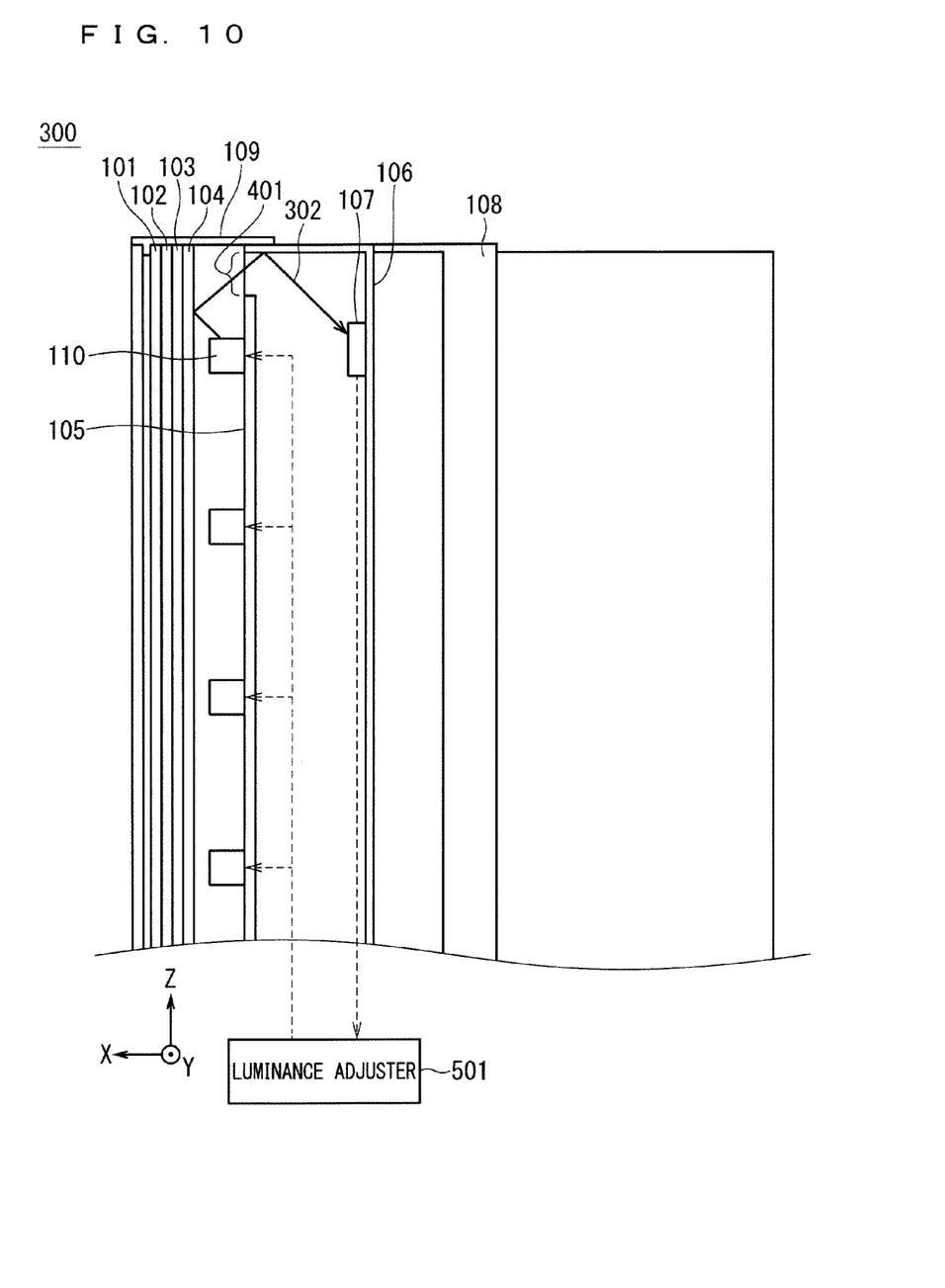
FIG. 10 is a sectional view of the liquid crystal display according to the third preferred embodiment.

FIG. 9 is a perspective sectional view of a liquid crystal display 300 in third preferred embodiment. Further, FIG. 10 is a sectional view of the liquid crystal display 300. In the first preferred embodiment, the photodetector 107 is disposed on the rear surface of the panel holder 106 (the surface on the −X direction side). On the other hand, in the third preferred embodiment, as shown in FIGS. 9 and 10, a photodetector 107 is disposed on a front surface of a panel holder 106 (a surface on an X direction side). In other words, the photodetector 107 is disposed between the panel holder 106 and a reflection sheet 105. It should be noted that, in the third preferred embodiment, since the photodetector 107 is disposed on the front surface of the panel holder 106, it is not necessary to provide a hole 111 for propagating light in the panel holder 106. Since the other configurations are the same as those in the first preferred embodiment, descriptions thereof are omitted.

FIG. 10 shows an optical path 302 of light incident on the photodetector 107. A part of the light emitted from an LED light source 110 is reflected by a back surface of a diffusion plate 104 and passes through a gap 401 between the reflection sheet 105 and the panel holder 106. A part of the light passed through the gap 401 enters the photodetector 107. In other words, the photodetector 107 detects a luminance of the light passed through the gap 401 between the reflection sheet 105 and the panel holder 106. Further, a part of the light reflected by the diffusion plate 104 after reflecting on the reflection sheet 105 also enters the photodetector 107 by passing through the gap 401.

Since luminance adjusting operation of the liquid crystal display 300 in the third preferred embodiment is the same as that in the first preferred embodiment (FIG. 7), descriptions thereof are omitted. It should be noted that, in the third preferred embodiment, the plurality of photodetectors 107 may be disposed as with the second preferred embodiment.

<Effects>

In the liquid crystal display 300 of the third preferred embodiment, the photodetector 107 is disposed between the panel holder 106 and the reflection sheet 105. Since the photodetector 107 is disposed on the front surface of the panel holder 106 in the third preferred embodiment, there is no longer need to provide a hole for propagating light in the panel holder 106. With this configuration, it is possible to avoid such a problem that a positional relationship between a hole and the photodetector 107 is deviated due to vibrations during transportation of the liquid crystal display or the like and that detection of light cannot be accurately performed. Accordingly, the detection accuracy of light can be enhanced.

Fourth Preferred Embodiment

Figure 11:
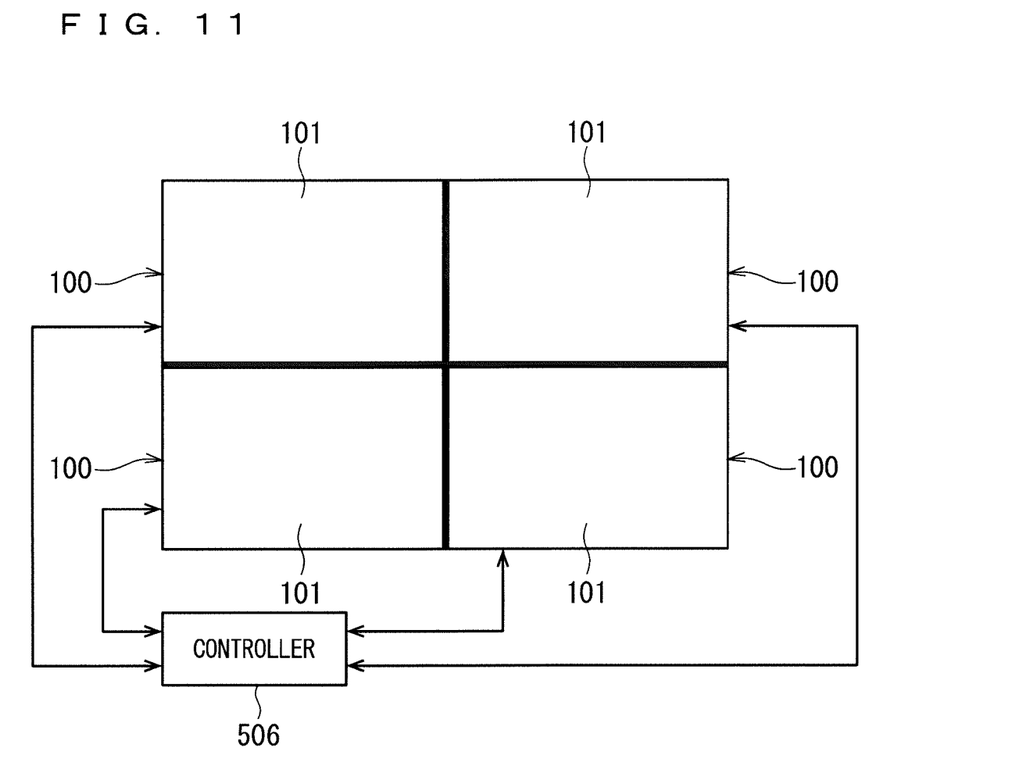
FIG. 11 is a diagram showing a configuration of a multi-screen display according to fourth preferred embodiment.

FIG. 11 is a diagram showing a configuration of a multi-screen display according to fourth preferred embodiment. As shown in FIG. 11, a screen of the multi-screen display is formed by combining screens (liquid crystal panels 101) of a plurality of liquid crystal displays 100 in a matrix form of, for example, 2×2.

The multi-screen display includes a controller 506. The controller 506 is communicably connected with a luminance adjuster 501 of each of the liquid crystal displays 100.

The controller 506 is realized by a processing circuit and a memory.

The processing circuit may be dedicated hardware. Further, the processing circuit may be a CPU to execute a program stored in the memory. In a case where the processing circuit is dedicated hardware, the processing circuit corresponds to, for example, a single circuit, a composite circuit, a programmed processor, a parallel programmed processor, an ASIC, an FPGA, or a combination of these.

In a case where the processing circuit is the CPU, a function of the controller 506 is realized by software, firmware, or a combination of the software and the firmware. The software or the firmware is described as a program and stored in the memory. The processing circuit realizes the function of the controller 506 by reading and executing the programs stored in the memory. Further, these programs can be also referred to as the programs which allow a computer to execute a procedure or a method of the controller 506. Here, the memory is a volatile or nonvolatile semiconductor memory, such as a RAM, a ROM, a flash memory, an EPROM, or an EEPROM.

The controller 506 obtains a luminance detected by the photodetector 107 from the luminance adjuster 501 of each of the liquid crystal displays 100. In the fourth preferred embodiment, the controller 506 obtains the luminances from the four liquid crystal displays 100. Then, for example, the controller 506 sets the smallest luminance of the four luminances as a common target value. It should be noted that a method of setting the common target value is not limited to this, and any common target value may be set as long as the luminance can be achieved by all of the liquid crystal displays 100.

Next, the controller 506 transmits the set common target value to the luminance adjuster 501 of each of the liquid crystal displays 100. The luminance adjuster 501 of each of the liquid crystal displays 100 calculates a luminance difference between the luminance detected by the photodetector 107 and the target value in the same way as the first preferred embodiment (see step S103 in FIG. 7). Then, the luminance adjuster 501 adjusts an output of each LED light source 110 based on the calculated luminance difference (see step S104 in FIG. 7).

According to the above-described steps, the luminance differences among the plurality of liquid crystal displays 100 are corrected, and a uniform luminance can be obtained as an entire screen of the multi-screen display. It should be noted that the plurality of liquid crystal displays 100 is combined in the multiscreen display in the fourth preferred embodiment. However, the plurality of liquid crystal displays 200 or the plurality of liquid crystal displays 300 may be combined instead of the liquid crystal displays 100.

Further, in the fourth preferred embodiment, any of the luminance adjusters 501 of the liquid crystal displays 100 may be configured to have a function of the controller 506 as well. In this case, the liquid crystal display 100 also having the function of the controller 506 and the other liquid crystal displays 100 are communicably connected to transmit and receive the luminance value and the target value.

<Effects>

The multi-screen display in the fourth preferred embodiment includes the plurality of liquid crystal displays 100 and the controller 506. The controller 506 controls the luminance adjuster 501 included in each of the liquid crystal displays 100 so that the luminance differences among the plurality of liquid crystal displays 100 are corrected based on detection results of the photodetectors 107 respectively included in the plurality of liquid crystal displays 100. The plurality of liquid crystal displays 100 is disposed so that the plurality of liquid crystal panels 101 forms one screen.

Generally, even if the liquid crystal displays have the same design and the same specification, there is dispersion of screen brightness among the plurality of liquid crystal displays. Therefore, in a case where the plurality of liquid crystal displays is combined to configure one large screen without luminance unevenness, it is necessary to correct the luminance differences among the liquid crystal displays. In the fourth preferred embodiment, the controller 506 corrects the luminance differences by utilizing the luminance detected by the photodetector 107 of each of the liquid crystal displays 100. With this configuration, the brightness and color of the plurality of liquid crystal displays 100 which configure the large screen can be uniformly adjusted.

It should be noted that, in the present invention, the respective preferred embodiments can be freely combined and the respective preferred embodiments can be appropriately modified and omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
    a liquid crystal panel;
    an LED light source to irradiate a back surface side of said liquid crystal panel with light;
    a diffusion plate disposed between said liquid crystal panel and said LED light source;
    a reflection sheet disposed behind said LED light souce, such that said LED light source is positioned between said reflection sheet and said diffusion plate;
    a panel holder disposed on a back surface side of said reflection sheet; and
    at least one photodetector disposed on the back surface side of said reflection sheet and to detect light reflected by a back surface of said diffusion plate and propagated in a gap between said reflection sheet and said panel holder.

2. The liquid crystal display according to claim 1, wherein said photodetector is disposed behind said panel holder, such that said panel holder is positioned between said photodetector and said reflection sheet, said panel holder is provided with a hole, and an optical path of said propagated light passes through said hole.

3. The liquid crystal display according to claim 1, wherein said photodetector is disposed between said panel holder and said reflection sheet.

4. The liquid crystal display according to claim 2, wherein said photodetector is disposed between said panel holder and said reflection sheet.

5. The liquid crystal display according to claim 1, wherein said at least one photodetector includes a plurality of said photodetectors.

6. The liquid crystal display according to claim 2, wherein said at least one photodetector includes a plurality of said photodetectors.

7. The liquid crystal display according to claim 1, further comprising a luminance adjuster to adjust a luminance of said LED light source based on a detection result of said at least one photodetector.

8. The liquid crystal display according to claim 2, further comprising a luminance adjuster to adjust a luminance of said LED light source based on a detection result of said at least one photodetector.

9. A multi-screen display comprising:

a plurality of the liquid crystal displays according to claim 7; and a controller to control said luminance adjuster included in each of said liquid crystal displays so that luminance differences among the plurality of said liquid crystal displays are corrected based on the detection results of said photodetectors respectively included in the plurality of said liquid crystal displays, wherein the plurality of said liquid crystal displays is disposed so that a plurality of said liquid crystal panels forms one screen.

10. A multi-screen display comprising:

a plurality of the liquid crystal displays according to claim 8; and a controller to control said luminance adjuster included in each of said liquid crystal displays so that luminance differences among the plurality of said liquid crystal displays are corrected based on the detection results of said photodetectors respectively included in the plurality of said liquid crystal displays, wherein the plurality of said liquid crystal displays is disposed so that a plurality of said liquid crystal panels forms one screen.

* * * * *